United States Patent [19]

Husain et al.

[11] Patent Number: 4,762,382

[45] Date of Patent: Aug. 9, 1988

[54] OPTICAL INTERCONNECT CIRCUIT FOR GAAS OPTOELECTRONICS AND SI VLSI/VHSIC

[75] Inventors: Anis Husain, Roseville; Charles T. Sullivan, Burnsville, both of Minn.

[73] Assignee: Honeywell Inc., Minneapolis, Minn.

[21] Appl. No.: 66,930

[22] Filed: Jun. 29, 1987

[51] Int. Cl.[4] .................................................. G02B 6/10
[52] U.S. Cl. ............................. 350/96.12; 350/96.11
[58] Field of Search ............... 350/96.11, 96.12, 96.13, 350/96.14

[56] References Cited

U.S. PATENT DOCUMENTS

| | | | |
|---|---|---|---|
| 3,879,606 | 4/1975 | Bean | 350/96.12 |
| 4,178,197 | 12/1979 | Marinace | 350/96.12 |
| 4,426,440 | 1/1984 | Thompson | 350/96.12 |
| 4,585,299 | 4/1986 | Strain | 350/96.12 |
| 4,652,077 | 3/1987 | Erman et al. | 350/96.12 |
| 4,652,290 | 3/1987 | Cho et al. | 350/96.12 |
| 4,693,543 | 9/1987 | Matsumura et al. | 350/96.11 |
| 4,701,008 | 10/1987 | Richard et al. | 350/96.12 |

FOREIGN PATENT DOCUMENTS

| | | | |
|---|---|---|---|
| 53-114449 | 10/1978 | Japan | 350/96.12 |
| 54-161350 | 12/1979 | Japan | 350/96.12 |
| 59-159105 | 9/1984 | Japan | 350/96.12 |

Primary Examiner—William L. Sikes
Assistant Examiner—Frank González
Attorney, Agent, or Firm—Omund R. Dahle

[57] ABSTRACT

This invention discloses an optical interconnect structure for routing and distributing optical signals on silicon chip carriers to realize high-density packaged optical interconnects for discrete GaAs optoelectronic IC's.

23 Claims, 4 Drawing Sheets

OPTICAL INTERCONNECT CIRCUIT FOR GAAS OPTOELECTRONICS AND SI VLSI/VHSIC

BACKGROUND AND SUMMARY OF THE INVENTION

The U.S. Government has certain rights in this invention pursuant to the terms of a contract F33615-85-C-1848.

The performance of systems using Si VLSI/VHSIC and GaAs IC's is becoming increasingly limited by chip interconnections. There is a growing need for higher throughput processing capabilities coupled with high reliability and flexibility. In recent years, rapid progress has been made in VLSI/VHSIC technology that improves on-chip density and speed. As this trend continues, increased problems become apparent in interconnecting large, fast chips. Critical issues concerned with large pinout high-speed interconnects are reliability and cost, on-chip driver size and power, crosstalk, line matching, signal skew, and lack of flexibility in design and test. Chip-to-chip interconnects using optoelectronic components and optical waveguides offer a solution to many of these interconnect problems. Optical interconnects exhibit extremely large bandwidths and are insensitive to crosstalk and outside interference. By utilizing these characteristics of optical interconnects, it is possible to interconnect high-speed chips with optical channels and realize an increase in effective interconnect density and a decrease in system power, interference, and crosstalk.

Optical interconnects using optical fibers are attractive alternatives to electrical interconnects, but the fiber is bulky, brittle, physically incompatible with IC's (cylindrical vs. rectangular symmetry), and incapable of sharp bends, abrupt branches, and crossovers.

This invention provides a thin-film high-density, packageable optical interconnect circuit for GaAs optoelectronic IC's (which can be interconnected with Si VLSI/VHSIC's). It concentrates on routing and distributing optical signals on silicon chip carriers to realize high-density packaged optical interconnects for discrete GaAs optoelectronic IC's. A basic structure of using a common Si chip carrier to support optical channel waveguides, GaAs chips, and Si chips is disclosed. Optical circuit components disclosed for the transmission, routing and distribution of the signals are straight optical channel waveguides, abrupt waveguide corner bends, waveguide branches, and waveguide crossovers.

DESCRIPTION

Figure 1:
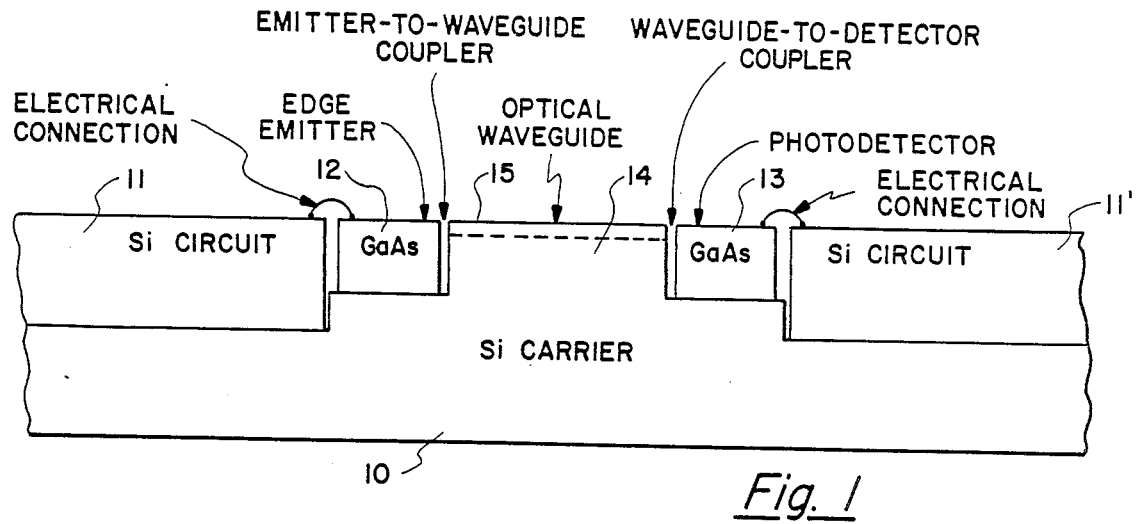
FIG. 1 shows in block diagram form a GaAs and Si optical interconnect system.

The optical interconnect circuit presented herein solves a problem of implementing high-density, packageable optical interconnects for GaAs optoelectronics. Since GaAs and Si IC's can be well interconnected electrically, this invention enables a high-speed, high-density interconnection of Si IC's. FIG. 1 shows a schematic cross section of the basic concept. A Si carrier 10 is used as the substrate for mounting the discrete Si chips 11 and 11' and GaAs chips 12 and 13, and as the optical substrate 14 for the optical interconnect circuit 15. Specifically the optical interconnect shown takes a signal from the Si circuit 11 and converts it to a modulated optical beam in the GaAs edge emitter 12, couples it through a thin-film optical waveguide 15 to GaAs photodetector 13 and then into Si circuit 11'. The GaAs edge emitter 12 may be a diode laser, a light emitting diode, or a superluminescent diode. The GaAs photodetector 13 may be a PN diode, a PIN diode, an avalanche photodiode, or a photoconductor.

The wavelength of the optical signal in GaAs based semiconductor edge-emitters is in the range of ~780 nm to ~905 nm. The range basically refers to different compositions of $Al_xGa_{1-x}As$ which may be used. Thus for example at $Al_{0.30}Ga_{0.70}As$ the wavelength is ~830 nm. The waveguide dimensions are generally on the order of the wavelength in the waveguide material.

Figure 2:
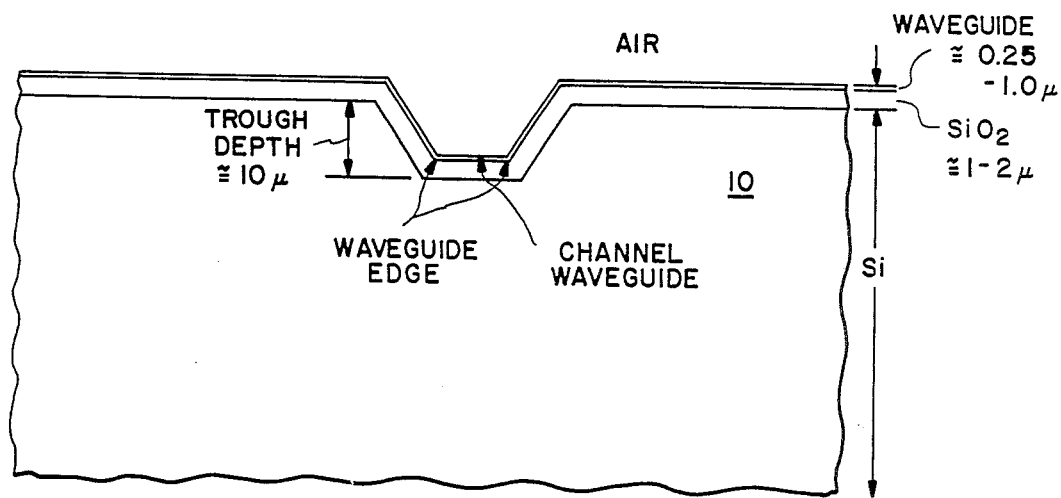
FIG. 2 is drawn from an optical micrograph of a cleaved cross section of the waveguide trough.

FIG. 2 is reproduced from an optical micrograph of a cleaved cross section of a channel or trough waveguide in accordance with the invention. It should be noted from this figure that the trough depth etched into the silicon substrate is much greater than the waveguide thickness. In this embodiment the trough depth etched into the silicon substrate is about 10 microns, the thickness of the silicon dioxide ($SiO_2$) layer is in the range of 1-2 microns, and the thickness of the waveguide material is about 0.25 microns. Optically the waveguide layer is transparent and thick enough to support one mode. In this embodiment the trough depth is approximately 40 times the waveguide thickness. The trough depth and waveguide thickness determine the optical waveguide channel confinement. Additional fabricational procedures are not necessary to achieve channel confinement, thus enabling very low propagation loss.

The propagation loss of the optical modes in the channel waveguides are determined essentially by the residual loss of the waveguide material itself. Conventional channel waveguides are delineated by additional selective deposition or etching processes that always cause additional and usually very substantial propagation losses. The long thermal growth of $SiO_2$ on Si and the anisotropic etching of Si in this invention smooth and straighten out the channel sidewalls, thus overcoming the fundamental limitations of conventional fabrication processes.

The Si carrier is an excellent substrate material for optical circuits and electronic circuits in GaAs and Si for the following reasons:

(a) the thermally-grown $SiO_2$ has excellent optical characteristics (low optical absorption, low refractive index, smooth surface, etc.),
(b) the thermal conductivity of Si is more than three times greater than in GaAs,
(c) Si microstructure technology is very well developed,
(d) Si and its associated electronic device technology is very well understood,
(e) Si is available in large diameters at relatively low cost, (f) the electronic circuits can be discrete high-performance IC's mounted on the Si carrier or can be fabricated in the carrier itself, and (g) all components required in optical interconnect circuits can be fabricated monolithically on the Si carrier. These components include branches, bends, crossovers, switches, and modulators. The photodetectors may be made in Si or in GaAs.

Figure 3:
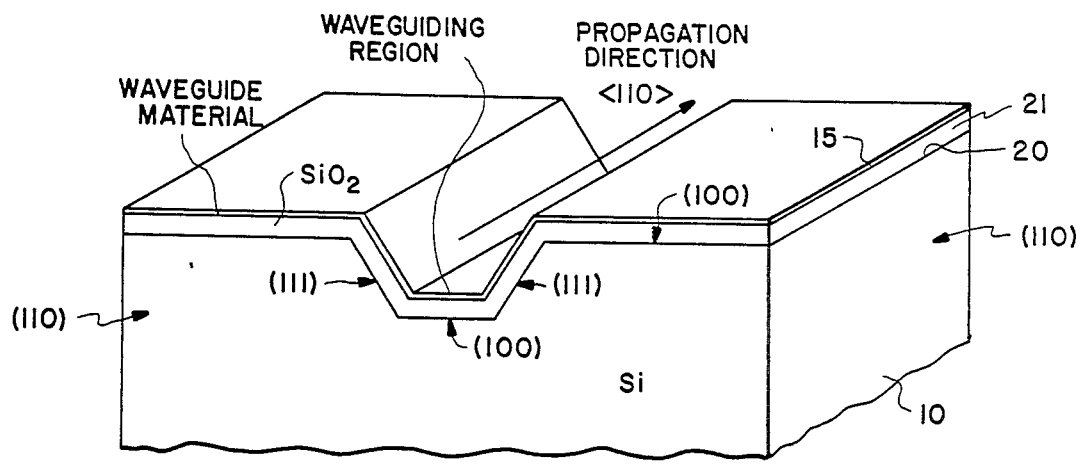
FIG. 3 shows an optical channel waveguide structure.
Figure 4A:
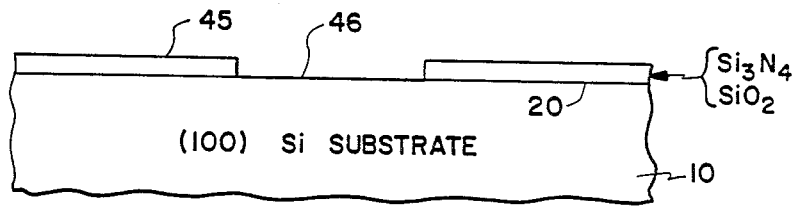
FIGS. 4(a)–4(d) show a waveguide trough fabrication sequence.
Figure 4B:
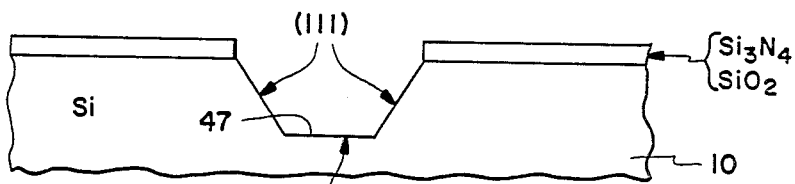
Figure 4C:
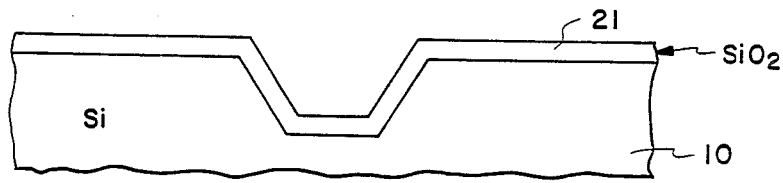
Figure 4D:
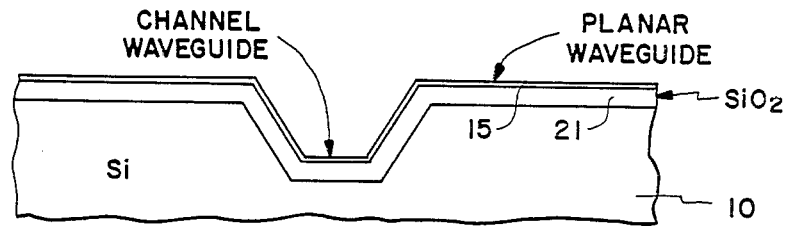

FIG. 3 is a more diagrammatic presentation of the basic optical channel waveguide structure and shows the silicon substrate 10 having grown on its surface 20 the thin film dielectric layer 12 of silicon dioxide ($SiO_2$). The uniform dielectric layer follows the contour of the surface and trough. Deposited on the surface of layer 21 is the thin film layer 15 of waveguiding material. This optical channel waveguide is fabricated by anisotropic wet chemical etching of Si to form the trough. The layer of $SiO_2$ is preferably grown thermally and then the waveguide material 15 is deposited uniformly over the $SiO_2$ top surface as shown in FIG. 3. The waveguide material may be, for example, ZnO, $Ta_2O_5$, $Al_2O_3$ or mixed oxide glassy films deposited by ion-beam sputtering. These material have relatively high indexes of refraction. The optical signal is confined to the waveguiding region and propagates along the flat-bottom of the trough. The waveguiding region is defined by the refractive index difference at its bottom (the oxidized (100) face of Si), at its top (the waveguide-air interface), and at its sides (the oxidized (111) faces of Si). As detailed earlier, the depth of the trough must be significantly larger than the thickness of the waveguide in order for the light to be confined to the trough. In one successful embodiment the width of the trough at the waveguide level of the trough bottom is about 5 microns.

FIG. 4 shows in more detail a fabrication sequence of the waveguide trough disclosed in FIGS. 2 and 3. A (100) monocrystalline silicon substrate having a (100) planar surface 20 has formed on the surface, as shown in FIG. 4a, a silicon nitride and silicon dioxide etch mask 45 with delineation 46. An anisotropic etch, such as KOH, is then used to etch the trough 47. The mask 45 is removed and a thermal oxide growth ($SiO_2$) 21 is made which is on the order of 1–2 microns thick. The planar waveguiding material 15 is then deposited, for example, by ion-beam sputtering. Other thin film solid deposition techniques may be used as well.

Figure 5:
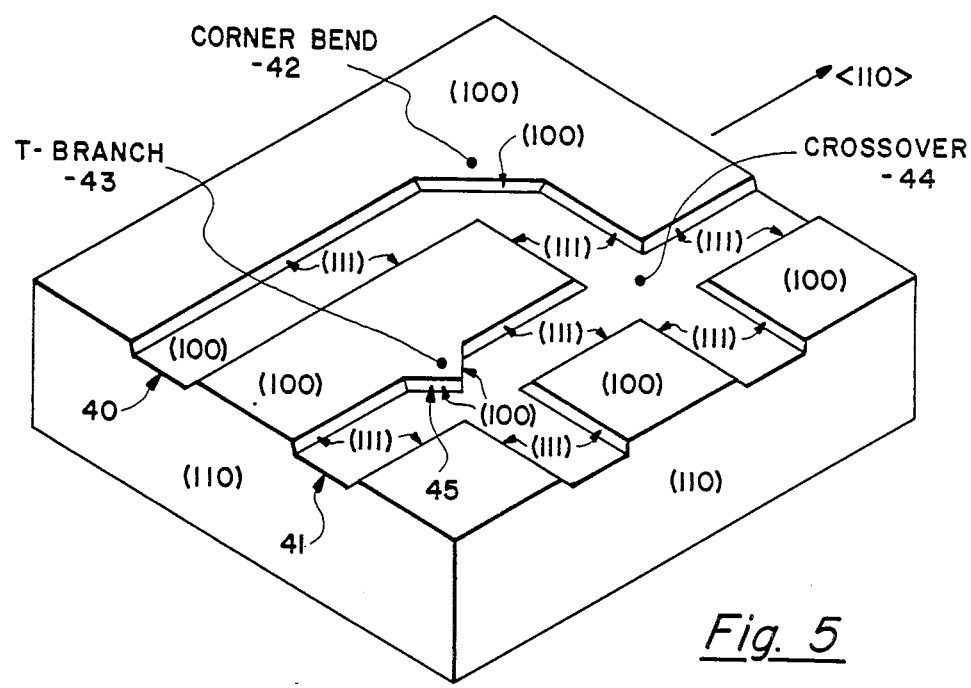
FIG. 5 shows a combination of waveguide structures.

Referring now to FIG. 5 there is shown pictorially an example of a number of waveguides 40 and 41, a corner bend 42, a T-branch 43, and a crossover 44. A key feature of these channel waveguides is that they are all parallel or perpendicular to one another in the (100) plane. Thus, many parallel channels can be packed in close proximity to one another with no interchannel interference. Similarly, the abrupt 90 degree crossovers permit little, if any, crosstalk.

Proper mask design and controlled etching will enable corner bends, T-branches, and crossovers to be made as shown in FIG. 5. These are the basic components required to achieve high-density optical signal transmission, routing, and distribution. A key feature of both the T-branch and the corner bend in FIG. 5 is that they are formed by the (100) face of Si which is perpendicular to the plane of the waveguide and at 45 degrees to the (110) direction of both perpendicular intersecting channel waveguides. Thus, the optical signal propagating in a single channel can be reflected efficiently into a perpendicular channel (in the same way a beam of light is reflected from a mirror). Similarly, the protrusion 45 of the deflector in the T-branch of FIG. 5 determines the fraction of the optical power propagating in each output channels.

Figure 6:
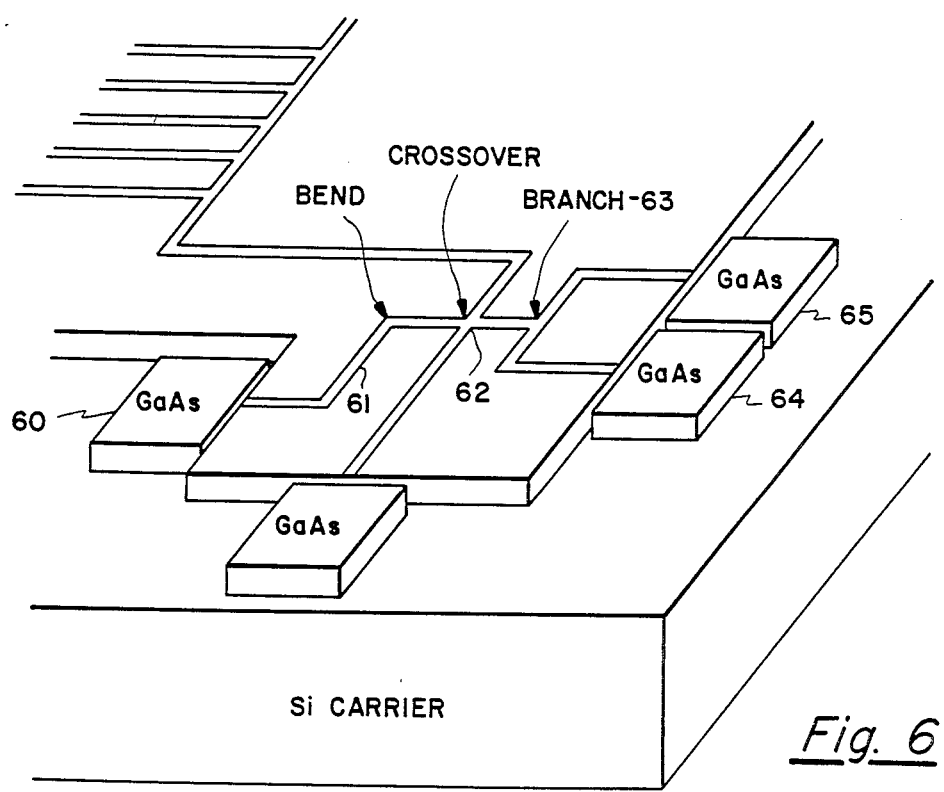
FIG. 6 shows an optical interconnect network.
Figure 7A:
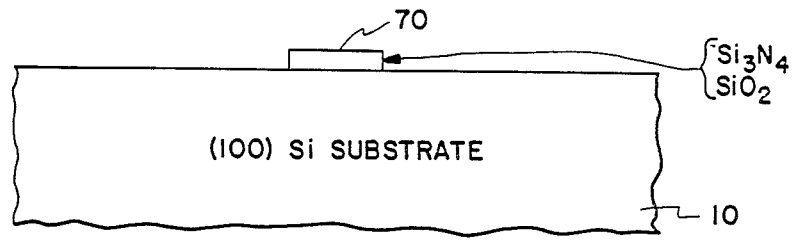
FIGS. 7(a)–7(d) show a waveguide mesa fabrication sequence.
Figure 7B:
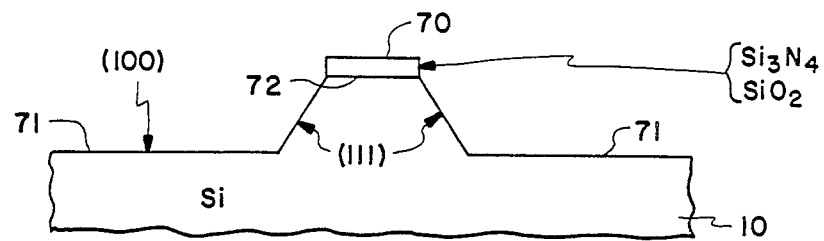
Figure 7C:
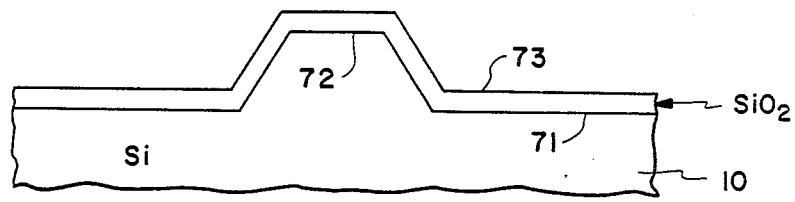
Figure 7D:
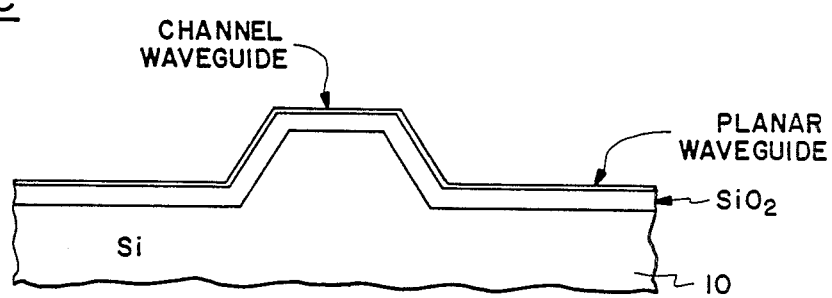

A pictorial view of an optical interconnect network is shown in FIG. 6 and depicts a sample implementation of this optical interconnect circuit concept for GaAs optoelectronic IC's. Both transmit and receive functions can be implemented on each IC. Thus, for example, FIG. 6 shows that signals from a GaAs emitter 60 are transmitted through optical waveguide 61, through a crossover 62 and a fan-out T-branch 63 to a pair of GaAs photodetector receiving units 64 and 65.

A preferred embodiment of the optical interconnect circuit shown in FIG. 7 is the inverted channel or mesa structure and fabrication sequence. The fabrication sequence is generally similar to that of FIG. 4, earlier described, except that the etch mask pattern of FIG. 7 is in a sense reversed. Thus in FIG. 7a the $Si_3N_4/SiO_2$ mask 70 determines the position, size and route of the elevated channel or mesa to be formed. FIG. 7b shows the anisotropic etch step removing silicon (about 10 micrometers) to form a new shoulder surface 71 while leaving the original surface 72 delineating the future waveguide shape. The mask 70 is then removed. In FIG. 7c the oxide growth is performed to provide a uniform dielectric layer 73 of $SiO_2$ over the silicon surface and mesa. This is followed in FIG. 7d by deposition of the thin film waveguide material 74 uniformly over the surface. The waveguiding material on top of the mesa now becomes the channel waveguide. In this elevated channel waveguide of FIG. 7d, as in the earlier described trough embodiment, the optical signal is contained by the waveguide edge within the channel waveguide. The bends, crossovers, T-branches and mesa waveguides follow basically the same rules as described for the trough embodiment. One difference is that the channel width in the mesa approach is the same as the mask width, whereas in the trough embodiment, the channel width is determined by the mask width as well as the etch depth.

The embodiments of the invention in which an exclusive properly or right is claimed are defined as follows:

1. An optical waveguide interconnect circuit comprising:
    an anisotropically-etched flat-bottom channel in a planar surface of a monocrystalline silicon substrate;
    a uniform thin-film dielectric layer over said planar surface and channel surface; and,
    a uniform thin-film waveguiding layer over said dielectric layer whereby said waveguiding layer on said flat-bottom operates as a waveguide.

2. The invention according to claim 1 in which said anisotropically etched flat-bottom channel has a depth on the order of 10 microns into the substrate.

3. The invention according to claim 1 in which said dielectric layer is thermally grown or deposited $SiO_2$.

4. The invention according to claim 1 in which said dielectric layer has a thickness range of 1–2 microns.

5. The invention according to claim 3 in which said dielectric layer has a thickness range of 1–2 microns.

6. The invention according to claim 1 in which said waveguiding layer is a material selected from the group consisting of $Al_2O_3$, ZnO, $Ta_2O_5$, and mixed oxide glassy films.

7. The invention according to claim 6 in which said waveguiding layer has a thickness between about 0.25 and 1.0 micron.

8. An optical waveguide interconnect circuit comprising:
   a monocrystalline silicon substrate with a first surface having a predetermined orientation with respect to a crystalline structure in the substrate;
   an anisotropically etched flat-bottomed channel in said substrate, said channel etched into said first surface, said channel etched to a depth on the order of 10 microns;
   a uniform thin-film dielectric layer over said first surface and channel; and
   a uniform thin-film waveguiding layer over said dielectric layer of a material selected from the group consisting of $Al_2O_3$, ZnO and $Ta_2O_5$, said waveguiding layer being thinner than the channel depth by a factor of about 10 to 40.

9. The invention according to claim 8 in which said substrate is (100) silicon having a (100) major surface.

10. The invention according to claim 9 said anisotropically etched flat-bottom channels are oriented along said (110) direction or orthogonally thereto.

11. The invention according to claim 8 in which said dielectric layer is thermally grown or deposited $SiO_2$.

12. The invention according to claim 11 in which said dielectric layer has a thickness range of 1-2 microns.

13. The invention according to claim 8 in which said waveguiding layer has a thickness between about 0.25 and 1.0 micron.

14. An optical waveguide interconnect circuit comprising:
   a single crystalline silicon substrate having a first surface which is selectively anisotropically etched to define an elongated narrow planar surface upon which to fabricate a waveguide;
   said elongated narrow planar surface being in a plane parallel to and displaced from said first surface as a result of said anisotropic etching;
   a uniform thin-film dielectric layer over said silicon substrate first surface and planar surface; and,
   a uniform thin-film waveguiding layer over said dielectric layer, said waveguiding layer lying over the elongated narrow planar surface area operating as a waveguide.

15. An optical waveguide interconnect circuit according to claim 14 in which said elongated narrow planar surface is elevated above said first surface to form an elevated channel waveguide.

16. An optical waveguide interconnect circuit according to claim 15 which has a thin-film waveguide with an abrupt corner bend, further comprising:
   said silicon substrate having a (100) planar surface;
   said elongated narrow planar surface having a first portion thereof aligned along said <110> direction, and having a second orthogonal portion joining said first portion to form said abrupt corner bend,
   said abrupt corner bend having an inside corner and an outside corner section, said outside corner section comprising a reflective plane at 45° to said <110> direction.

17. An optical waveguide interconnect circuit according to claim 14 in which said elongated narrow planar surface is depressed below said first surface to form a depressed channel waveguide.

18. An optical waveguide interconnect circuit according to claim 17 which has a thin-film waveguide with an abrupt corner bend, further comprising:
   said silicon substrate having a (100) planar surface;
   said elongated narrow planar surface having a first portion thereof aligned along said <110> direction, and having a second orthogonal portion joining said first portion to form said abrupt corner bend,
   said abrupt corner bend having an inside corner and an outside corner section, said outside corner section comprising a reflective plane at 45° to said <110> direction.

19. An optical waveguide interconnect circuit comprising:
   a monocrystalline silicon substrate having an elongated narrow elevated mesa surface portion in a first plane which defines an elevated waveguide channel to be fabricated, and having a recessed surface portion in a second plane parallel to and recessed below said mesa portion by anisotropic etching;
   a uniform thin-film dielectric layer over said substrate mesa surface and recessed surface;
   a uniform thin film waveguiding layer over said dielectric layer, said waveguiding layer over the mesa surface area operating as a waveguide.

20. The optical waveguide interconnect circuit according to claim 19 in which said mesa surface is elevated on the order of 10 microns above said recessed surface portion.

21. The optical waveguide interconnect circuit according to claim 19 in which said dielectric layer has a thickness range of about 1-2 microns.

22. The optical waveguide interconnect circuit according to claim 20 in which said uniform waveguiding layer has a thickness on the order of 0.25 microns.

23. The optical waveguide interconnect circuit according to claim 19 in which said waveguiding layer is a material selected from the group consisting of $Al_2O_5$, ZnO and $Ta_2O_5$.

* * * * *